United States Patent [19]

Vache

[11] 4,105,013
[45] Aug. 8, 1978

[54] PORTABLE STOVES

[75] Inventor: Marcel Vache, Sainte-Foy-les-Lyon, France

[73] Assignee: Application Des Gaz, Saint Genis Laval, France

[21] Appl. No.: 722,901

[22] Filed: Sep. 13, 1976

[30] Foreign Application Priority Data

Sep. 23, 1975 [FR] France .................... 75 29695

[51] Int. Cl.² .......................................... F24C 5/20
[52] U.S. Cl. .................................. 126/38; 126/44; 431/344
[58] Field of Search ............... 126/38, 44, 9; 431/344

[56] References Cited

U.S. PATENT DOCUMENTS

| 2,154,305 | 4/1939 | Goerl | 126/38 |
|---|---|---|---|
| 2,397,766 | 4/1946 | Tullis | 126/38 |
| 2,465,572 | 3/1949 | Bramming | 126/44 X |
| 2,538,538 | 1/1951 | Stempel et al. | 126/38 |
| 2,853,126 | 9/1958 | Corlet | 126/38 X |

FOREIGN PATENT DOCUMENTS 566,618  1/1945  United Kingdom ............ 126/44

Primary Examiner—Edward G. Favors
Attorney, Agent, or Firm—Dowell & Dowell

[57] ABSTRACT

A portable stove of the type fuelled from a replaceable pressurized combustible gas cartridge and having means for connecting a burner head to the replaceable cartridge, said stove being equipped with a dished wind shield having a rim which surrounds the burner head, and cooking vessel support arms pairs of which are formed by yokes pivoted along their middle sections on the floor of the dished wind shield such that the arms are movable between cooking vessel supporting positions in which the said arms extend beyond the rim of the said wind shield and stowing positions in which the said arms are moved back within the periphery of the rim. A pair of covers, which telescopically fit one into the other have the dual function of serving separately as saucepans and in co-operation as an expandible housing for the stove. The ends of the arms are shaped so as to provide, when the arms are extended, upstanding portions which are inscribed in a circle whose diameter is greater than the external diameters of the covers.

11 Claims, 5 Drawing Figures

PORTABLE STOVES

FIELD OF INVENTION

The invention relates generally to portable stoves.

DESCRIPTION OF PRIOR ART

It is known that when saucepans are in course of being heated on a dish-supporting gridiron, it may happen that somebody, by a clumsy movement, causes the said pans to slide towards the rim or edge of the gridiron, off which they fall, as a result of which there is a danger of persons in the vicinity being scalded. The same incident can happen in a moving vehicle, for example, in a train or on a boat.

This inconvenience, which applies generally for all the cooking appliances of the portable stove type, is further aggravated in the case of the portable stoves which are widely used for camping, when travelling and for picnics, since such stoves are generally set up on ground of which the surface is not perfectly horizontal and on which often they do not have the full stability which is desired, because of their reduced seating surface.

An object of the invention is therefore to improve the stability on such stoves of saucepans and the like.

SUMMARY OF INVENTION

According to the invention there is provided a portable stove comprising a burner head, gas feed means adapted to connect said burner head to a pressurised combustible gas cartridge, a dished wind shield means for said burner, said shield means having a floor member and a rim surrounding said burner head, and cooking vessel support arms which are pivoted on the floor member of the said wind shield means and are each adapted to be movable between a cooking vessel supporting position in which they project beyond the periphery of the said rim and a stowing position in which the respective arm is moved back within the periphery of the rim.

In certain cases, the portable stoves, especially when they are designed for walking trips, mountaineering, pleasure cruising, etc., are considered to be too cumbersome, too heavy and unreliable in operation when they cannot be sufficiently screened from the wind.

Also the carrying of the saucepans, because of their cumbersome nature, and the possible loss of elements forming part of the stove to be fitted in position, also raises problems which frequently are insufficiently resolved.

It is therefore a further object of the invention to overcome these various other inconveniences.

BRIEF DESCRIPTION OF DRAWINGS

The invention will be best understood from the description which follows and from the accompanying drawings, which description and drawings, given particularly by way of illustration, will also make apparent other advantages and objectives and also the important characteristics of the invention, of which the main ones are also defined in the accompanying claims.

DESCRIPTION OF PREFERRED EMBODIMENT

It is known that any portable stove, on which it is desired to heat a dish, has to comprise a support holding this dish above a source of heat, and which is able to ensure around the burner a sufficient circulation of gas to permit the arrival of combustion-assisting air and the discharge of the burnt gases.

The said support is made to comprise, at its rim, retaining means which are capable of limiting the lateral displacements of the dishes, so as to prevent them from losing their balance and falling off.

Figure 1:
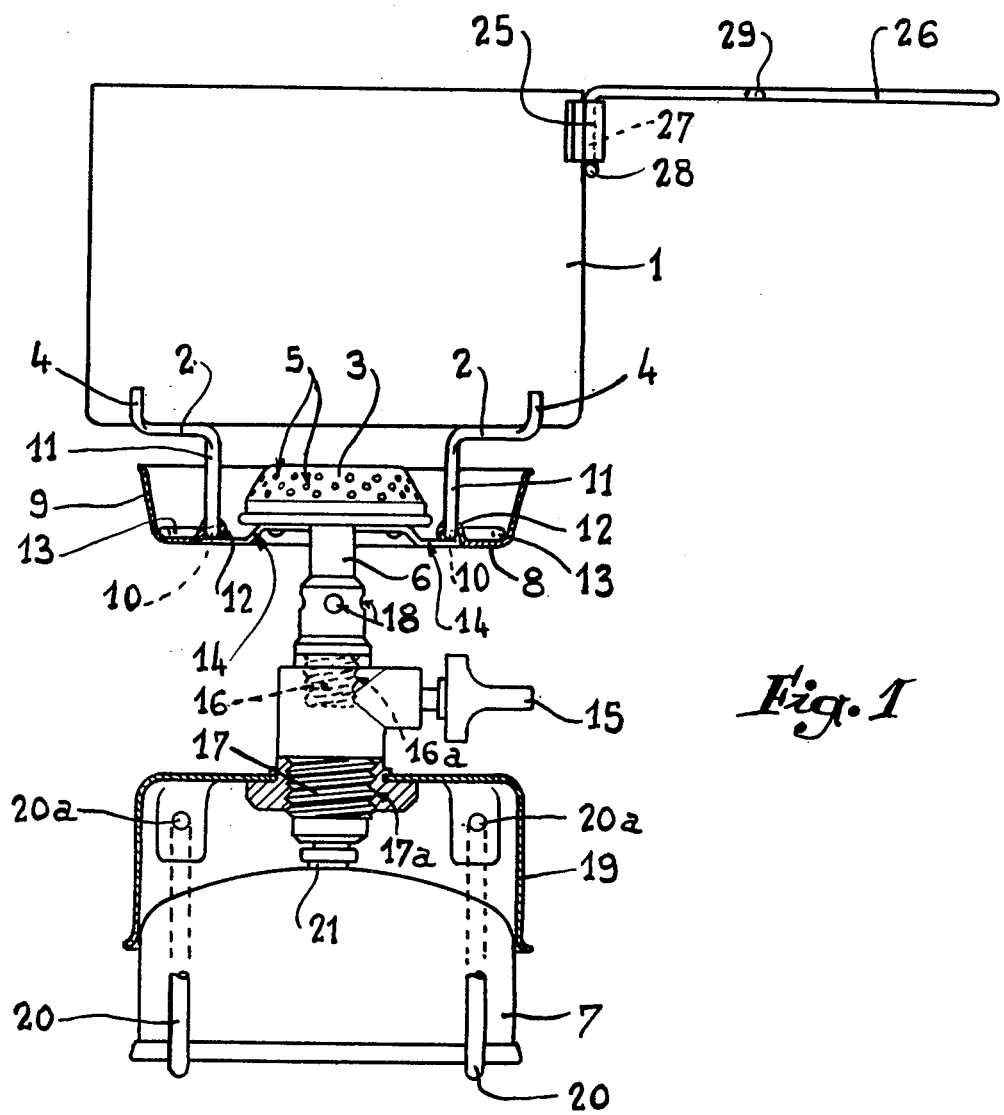
FIG. 1 is a diagrammatic view, partially in elevation and partially in section, of a stove according to the invention, more particularly intended for excursions and represented in the fitted condition, ready for use.

The portable stove which is shown in FIG. 1, intended more particularly for excursions or touring, comprises a support formed by arms 2 which are substantially horizontal and divergent from a single burner 3 in order to support a dish or saucepan 1, these arms 2 having their ends turned upwardly so as to form claws 4 for holding the dish or saucepan 1.

In the example illustrated, the burner 3 is of mushroom head formation, comprising peripheral gas outlets 5 and a vertical coaxial tube 6 capable of receiving the gas under pressure coming from a cartridge 7 and mixing it with the air for combustion, entering radially through peripheral orifices.

The burner head 3 is fixed on the base 8 of a dished member, through the centre of which the tube 6 extends and of which the upwardly directed peripheral wall 9 forms a wind shield around the gas outlets 5.

Figure 2:
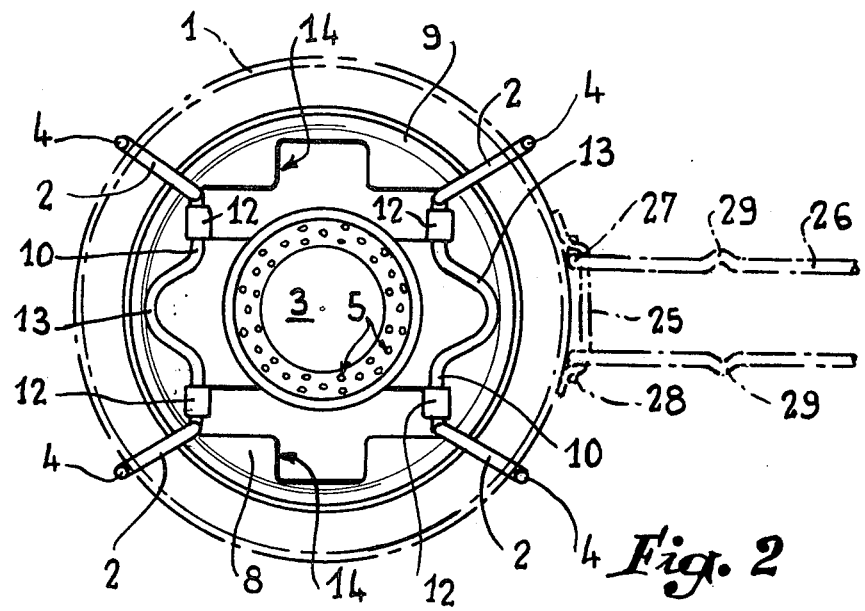
FIG. 2 represents the same stove, seen in plan view with the said utensils indicated in ghosted outline.
Figure 3:
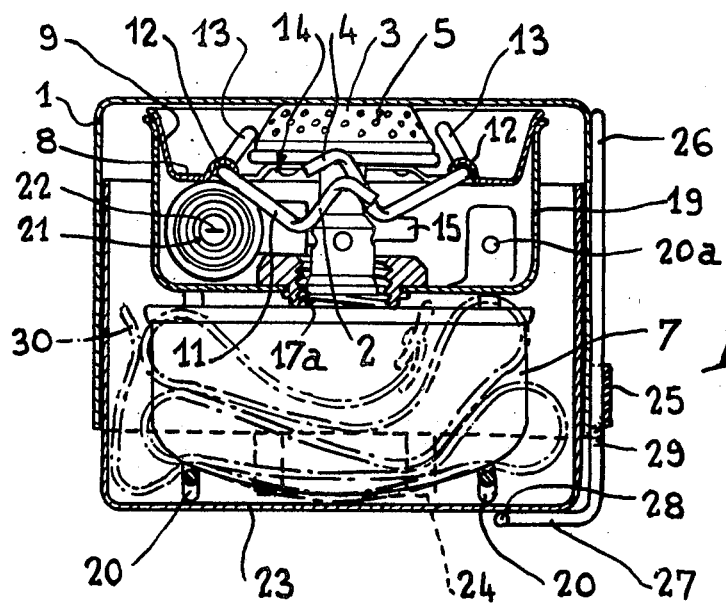
FIG. 3 is an axial section of the same stove, packed disassembled from the gas cartridge, in accordance with the invention, in two saucepans which serve as a casing or box for it.

The saucepan support is advantageously formed by complementary elements which are separately pivoted to the base 8 of the dished member so as to be able to pivot between two opposite positions: one position in which they extend above the peripheral wall 9, as can be particularly seen in FIG. 2, and another position in which they are brought back to the contour of the dished member for the storage of the stove, as can be seen more particularly in FIG. 3.

In the constructional form as illustrated, the dish support is formed by only two complementary elements, each forming a kind of stirrup or yoke pivoted in its middle part 10 on the bottom 8 of the dished member and comprising on either side of this part 10 two substantially symmetrical branches which are each composed, following it towards its free end, of sections which are substantially perpendicular to those which precede them: a first section 11 extending perpendicular to the section 10, that is to say, upwardly relatively to the bottom 8 of the dished member, until above the level of the upper rim of the peripheral wall 9, a second section 2 (to which reference has already been made above) extending perpendicular to the section 11, more or less radially and horizontally above the rim of the wall 9, and a third section 4 (to which reference has also already been made above) directed more or less vertically upwards so as to form the peripheral holding means of the saucepan 1, horizontally on the section 2.

In the embodiment as illustrated, the said middle part comprises, between two rectilinear sections 10 which are coaxially aligned and engaged beneath lugs 12 cut out in the bottom 8 and surrounding the said sections 10 so as to serve as a pivoting means for them, an intermediate middle arch 13 which is curved towards the exterior around the burner 3, in a plane parallel to that containing the horizontal arms 2, the said arch 13 serving as a stop on the bottom 8 for preventing the said arms 2 from pivoting in the joints or lugs 12 beyond the horizontal position, as may be seen in FIGS. 1 and 2.

It will be noted that the stirrups or yokes 2, 4, 10, 11, 13 can be obtained economically and rationally from a round-section metal wire which is suitably bent and curved.

Furthermore, it is convenient to provide openings 14 in the bottom 8 of the dished member, which openings are so shaped as to be able to provide passage to at least a part of the two arms of each yoke, that is to say, in the example represented in FIG. 3, to the section 11 and to a part of the section 2 of these arms, so as to enable the yoke to be completely retracted beneath the plane passing through the upper edge or rim of the wall 9, which may be of small height, by effecting a simple pivotal movement towards the interior of the dished member on the rectilinear middle sections 12.

It is seen that, in the stove assembled as shown in FIG. 1, the openings 14 serve as an inlet for air for combustion, which ascends towards the burner 3, from whence the burnt gases continue to rise and pass over the base of the saucepan 11 before escaping radially through the annular gap maintained between the upper edge of the peripheral wall 9 of the dished member and the said base, because the latter is supported at a certain height above the dished member on the horizontal arms 2 of the aforesaid stirrups or yokes.

In the case of a touring stove of the type in question, the upwardly extending ends 4 of the horizontal arms 2 are contained within a circle having a diameter larger than the external circle of the base of the saucepan 1, of which the internal diameter is, in its turn, larger than the external diameter of the peripheral wall 9 serving as wind shield, this permitting the saucepan 1 to be used in combination with the other elements of the stove in order to serve as a packaging box or casing for it, as shown in FIG. 3.

To the parts as already described for forming the portable stove and adapted to be packed in the saucepan, it is appropriate also to add an intermediate cock-type connecting element 15 for shutting off and regulating the gas and coaxial threaded unions 16 and 17 for respectively connecting it in detachable manner to the tube 6 of the burner 8 by a tapping 16a and to the cartridge 7 by means of a cover member 19.

Such a cover member 19 and its means for connecting it to a cartridge 7 have been described in detail in French Pat. No. 1,295,539, filed the 28, Apr. 1961.

This cover member 19 is designed in such a way as to be able to cap the cartridge 7 and to be engaged beneath its bottom by two stirrup members 20, pivoted at their ends, at 20a, to the periphery of the cover member 19.

This latter is traversed coaxially by a tapped hole 17a, into which the union 17 can be screwed by its corresponding screwthread, so as to bear by an annular joint 21 against the cartridge 7 and to pierce the latter in known manner inside this fluid-tight joint by a coaxial pointed needle 22 of flat lancet form (FIG. 3).

Figure 5:
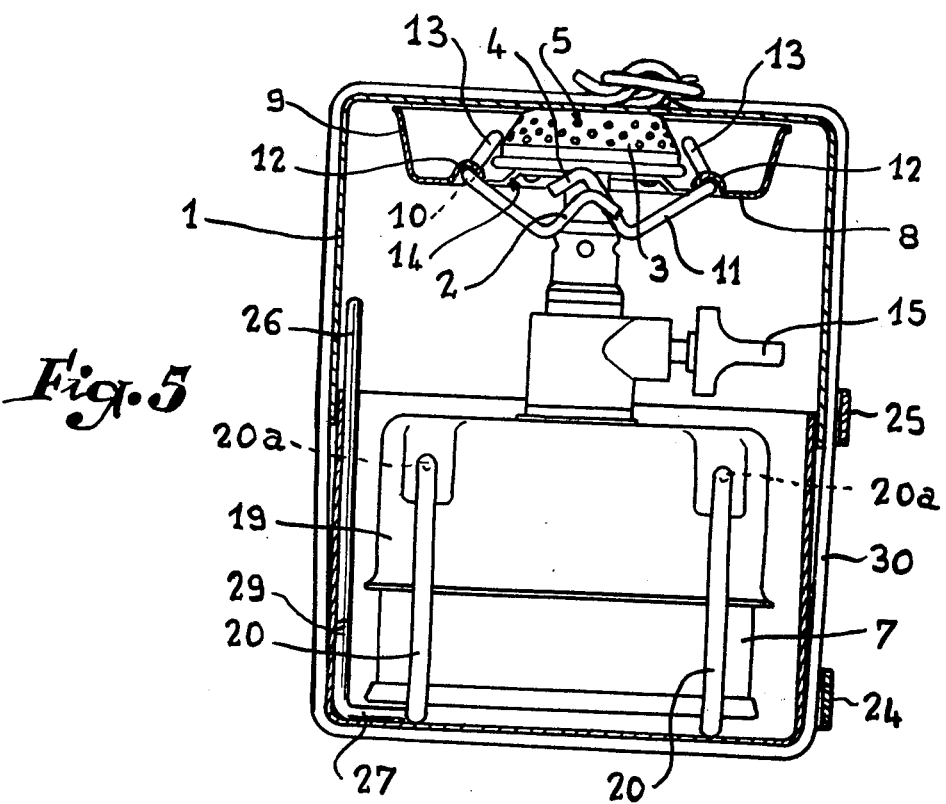
FIG. 5 is an axial section of the same stove packed in the same two saucepans, but this time mounted in operative position on its gas cartridge, bringing into effect the telescopic extensibility of the nesting of the saucepans in accordance with the invention.

Use is made of two deep cylindrical dishes or saucepans 1 and 23, which are capable of being nested telescopically to a greater or lesser extend on one another so as to be able to serve as a packaging case for the parts 2-22 which form the portable stove, either dismantled, with or without the gas cartridge 7, then offering a minimum space requirement (FIG. 3), or fitted and connected to the gas cartridge 7, the assembly then being of greater height (FIG. 5).

In the position which is shown in FIG. 3, which may be that in which the portable stove is offered for sale or even that when ready to start on an excursion, with a new cartridge 7 capable, if necessary, of being located between the yokes 20, the valve or cock 15 with the unions 16 and 17 is unscrewed and laid flat in the dished cover member 19, nested upside down beneath the shallower dished member 9, of which the central tapped hole 17a, with a diameter larger than that of the union 16, is able to provide a free passage to this latter.

Figure 4:
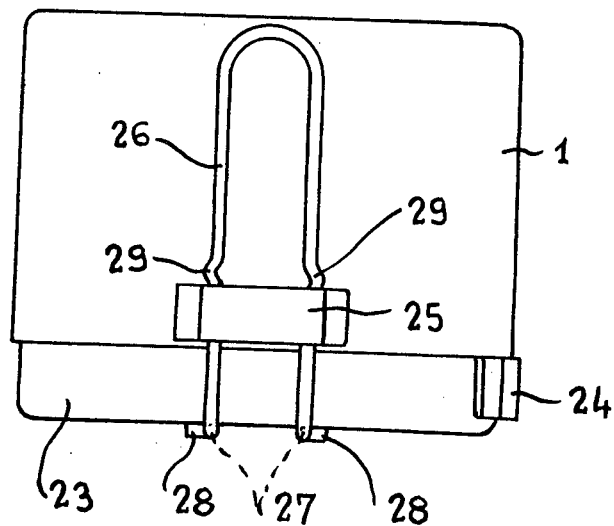
FIG. 4 is an external view of the assembly represented in FIG. 3, turned through 90° about its axis and making visible the detachable handle arranged according to the invention for serving as a closure means for this casing.

The dishes or saucepans 1 and 23 include guides 24, 25, respectively, at their periphery, one of them (23) at its free edge and the other (1) close to its base, as shown in FIG. 4, which guides are capable of providing a passage for a clip 26 which is curved substantially at right-angles in order to come into engagement with this curved portion on the bottom of the saucepan 1, so as to hold it nested beneath the saucepan 22, the said curved portion being moreover arranged so as to be capable of being engaged at will in the guide 24 or 25 of one or other of these saucepans 1 or 23, in order to fit it with a detachable radial handle, as can be seen particularly in FIG. 1.

The clip 26 is advantageously formed by a wire which has elastic flexibility and is shaped as a gripping device, of which the parallel end portions 27 are curved at a right-angle in order to extend in a flat position over the base of the saucepan 23 for a length corresponding to the height of the guides 24 and 25 and of which the ends 28 are bent over on the said base at a right-angled for diverging from one another.

Following the guide 24, the two parallel arms of the clip 26 form arched portions 29, which are outwardly curved, so as to be able to be engaged behind the guide 24, as may be seen in FIG. 4, thereby holding the assembly of the saucepans 1 and 23 in their mutual nesting position.

It is seen that, after the clip 26 has been withdrawn, it may easily be used as a detachable radial handle for one of the saucepans 1 or 23 by moving its free ends towards one another and causing them to pass through the corresponding guide 24 or 25, behind which the divergent ends 27 are resiliently engaged for locking this assembly.

The assembly may in addition be completed by a belt which is capable of being threaded through the guides 24 and 25 brought into alignment with one another on a single generatrix of the saucepans 1 and 23 which are nested one within the other in the position shown in FIG. 5, the detachable handle 26 then being inoperative, being placed inside the saucepans 1 and 23.

On the other hand, when the saucepans 1 and 23 are nested deeply one within the other and held in this nested position by the handle 26, as shown in FIG. 3, it is the belt 30 which, being inoperative, is placed inside the saucepans 1 and 23.

Thus it can be seen that a portable stove is obtained on which the saucepan is held in an extremely stable manner above the burner and which, when it is removed, can be packed with a minimum of size in the saucepans necessary for the use of said stove, which is very reliable in operation, broadly independent of the air currents and of which the weight can easily be brought to a minimum.

Furthermore, it has to be understood that the foregoing description has only been given by way of example and that it does not in any way limit the scope of the invention, from which there would be no departure if the constructional details as described are replaced by any other equivalents.

I claim:

1. Portable cooking apparatus including a dismountable stove for attachment to a liquid gas cartridge, and including two telescopable saucepans within which the stove is storable when not in use, said apparatus comprising:

a stove including a burner head supported in the center of an upwardly-opening dished wind shield member, the burner head having a connecting tube extending downwardly through a hole in the center of the shield member and having a threaded lower end, and the stove having a downwardly opening dished cover member below the end of the tube and shaped to receive a gas cartridge therein, and the stove having a gas cock member having a threaded upper end connectable to said tube and having a lower end extending through a central hole in the cover member and into communication with the gas in the cartridge when the stove is assembled in operative configuration, and the stove having pan supporting arms carried by said wind shield member, the arms being extensible from the shield member to support a saucepan and being retractable within the peripheral contour of the shield member; and two cylindrical wall saucepans, one telescopable within the other, and of diameter larger than the diameters of the shield member and the cover member, the saucepans being long enough to receive the assembled stove and cartridge therewithin in said operative configuration when telescoped partly together, and the stove being partly dismountable to a smaller configuration wherein the cover member is inverted to nest about said shield member with the gas cock member lying disassembled between the shield member and the cover member, and the stove thus configured being enclosable inside the saucepans which are telescoped further together.

2. In cooking apparatus as set forth in claim 1, clip means cooperative with said saucepans when telescoped together to secure them together in a selected one of their telescoped positions.

3. In cooking apparatus as set forth in claim 2, the side of the outermost of said telescoping saucepans having a guide member secured thereto and providing an opening through the guide member extending toward the other saucepan, and the clip means comprising a U-shaped member having portions at the ends of its legs extending at right angles thereto and adapted to overlie the bottom of said other saucepan and hold it in telescoped position when the U-shaped member is received in the opening of the guide member, and the clip means being reversible so that the right angle portions of its legs are receivable in the guide member with the U-shaped member extending from the saucepan to form a radial handle.

4. In cooking apparatus as set forth in claim 3, the other of said saucepans having a guide member attached thereto to receive said clip means to form therewith a radial handle.

5. In cooking apparatus as set forth in claim 1, the hole through said cover member being larger in diameter than said connecting tube and the tube extending through the hole when the cover member is inverted and nested with said shield member, and a gas cartridge being storable within the telescoped saucepans adjacent to said nested stove.

6. Portable cooking apparatus including a dismountable stove for attachment to a liquid gas cartridge, and two telescopable saucepans within which the stove is storable when not in use, said apparatus comprising:

a stove including a burner head, an upwardly opening dished wind shield member having a base with a hole through it and having a rim surrounding the head, the head having a connecting tube extending downwardly below the shield member and having a threaded lower end, and the stove having a downwardly opening dished cover member below the end of the tube and shaped to receive a gas cartridge therein, and the stove having a gas cock member having a threaded upper end connectable to said tube and having a lower end extending through a central hole in the cover member and into communication with the gas cartridge;

the stove having opposed pairs of saucepans supporting arms, each arm having a first section horizontally pivotally supported in the base of the shield member, a second section extending substantially normal to the first section, and a third section substantially perpendicular to the second section and extending radially from the cooking head when the arm is pivoted to an extended saucepan supporting position with its third section extending beyond the rim of the shield member, and the arms being pivotable to a retracted position wherein the third portion lies within the periphery of the rim; and two cylindrical-wall saucepans, one telescopable within the other, and of diameter larger than the diameters of the shield and cover member, the saucepans being long enough to receive the stove and cartridge therewithin when telescoped partly together, and the stove being partly dismountable to a smaller configuration wherein the cover member is inverted to nest about said shield member with the gas cock member disassembled inside the cover member, and the stove thus configured being located inside the saucepans which are telescoped further together.

7. In cooking apparatus as set forth in claim 6, each pair of supporting arms comprising a single U-shaped yoke having a common first section pivotally mounted to said base of the shield member.

8. In cooking apparatus as set forth in claim 7, the second sections of each yoke being mutually parallel, and the third sections extending radially with respect to the burner head when the arms are extended and terminating in upwardly-extending saucepan retaining ends.

9. In cooking apparatus as set forth in claim 6, the base of said dished shield member being apertured to recieve and pass the second and third sections of said arms so that the second and third sections extend through the base when the arms are in retracted position and lie beneath the rim of the shield member.

10. In cooking apparatus as set forth in claim 6, the burner head being fixed to the base of the shield member.

11. In cooking apparatus as set forth in claim 6, the first section of each arm having an off-set portion shaped to lie against the surface of the base of the shield member and stop the pivotal movement of the arm so that the third section thereof is horizontal when in extended position.

* * * * *